US008288671B2

(12) United States Patent
Liang et al.

(10) Patent No.: US 8,288,671 B2
(45) Date of Patent: Oct. 16, 2012

(54) KEY BUTTON STRUCTURE

(75) Inventors: Shi-Xu Liang, Shenzhen (CN); Yung-Chang Yen, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 306 days.

(21) Appl. No.: 12/780,040

(22) Filed: May 14, 2010

(65) Prior Publication Data
US 2011/0073452 A1 Mar. 31, 2011

(30) Foreign Application Priority Data
Sep. 28, 2009 (CN) .......................... 2009 1 0307830

(51) Int. Cl.
*H01H 3/12* (2006.01)

(52) U.S. Cl. .................................. 200/341; 361/679.01
(58) Field of Classification Search .................. 200/341; 361/679.01, 600, 728; 455/575.1
See application file for complete search history.

(56) References Cited

U.S. PATENT DOCUMENTS
2006/0258325 A1* 11/2006 Tsutaichi et al. ............. 455/350
2010/0220451 A1* 9/2010 Zaitz et al. .................... 361/752
* cited by examiner

*Primary Examiner* — Vanessa Girardi
(74) *Attorney, Agent, or Firm* — Altis Law Group, Inc.

(57) ABSTRACT

A key button structure includes a button body, a fixing member and a housing. The housing comprises a first housing and a second housing placed in the first housing. The first housing and the second housing together define an accommodating space. The first housing has a window defined therethrough communicating with the accommodating space. The fixing member and the button body are integrally and detachably assembled within the accommodating space of the housing. The button body is exposed through the window.

20 Claims, 5 Drawing Sheets

KEY BUTTON STRUCTURE

BACKGROUND

1. Technical Field

This exemplary disclosure generally relates to key button structures, and particularly to key button structures for portable electronic devices.

2. Description of Related Art

With the development of science and technology, portable electronic devices such as mobile phones and personal digital assistants (PDAs) are now widely used. Consumers may enjoy the full convenience of the portable electronic devices almost anytime and anywhere. The portable electronic devices usually include key button structures welded to housings. The welding makes it difficult to detach the key button structure for repair or reassembly.

Therefore, there is room for improvement within the art

BRIEF DESCRIPTION OF THE DRAWINGS

Many aspects of the exemplary key button structure can be better understood with reference to the following drawings. The components in the various drawings are not necessarily drawn to scale, the emphasis instead being placed upon clearly illustrating the principles of the exemplary key button structure. Moreover, in the drawings, like reference numerals designate corresponding parts throughout the diagrams.

DETAILED DESCRIPTION

In this exemplary embodiment, the key button structure is applied to a portable electronic device such as a mobile telephone. The mobile telephone described herein is a representation of the type of portable electronic device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, and the like. Accordingly, any reference herein to the mobile telephone should also be considered to apply equally to other portable electronic devices.

Figure 1:
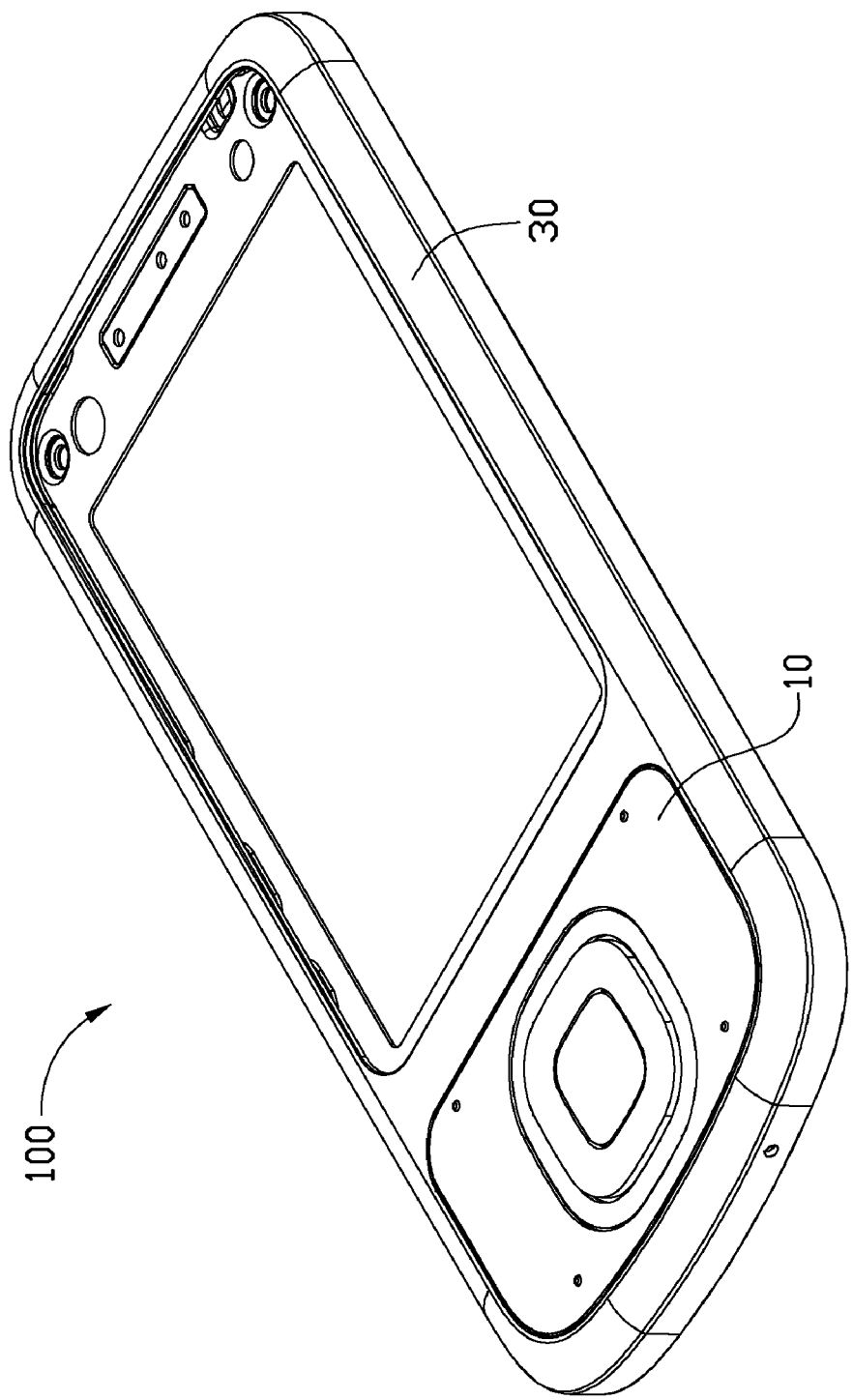
FIG. 1 shows an assembled perspective view of the key button structure, in accordance with an exemplary embodiment.
Figure 2:
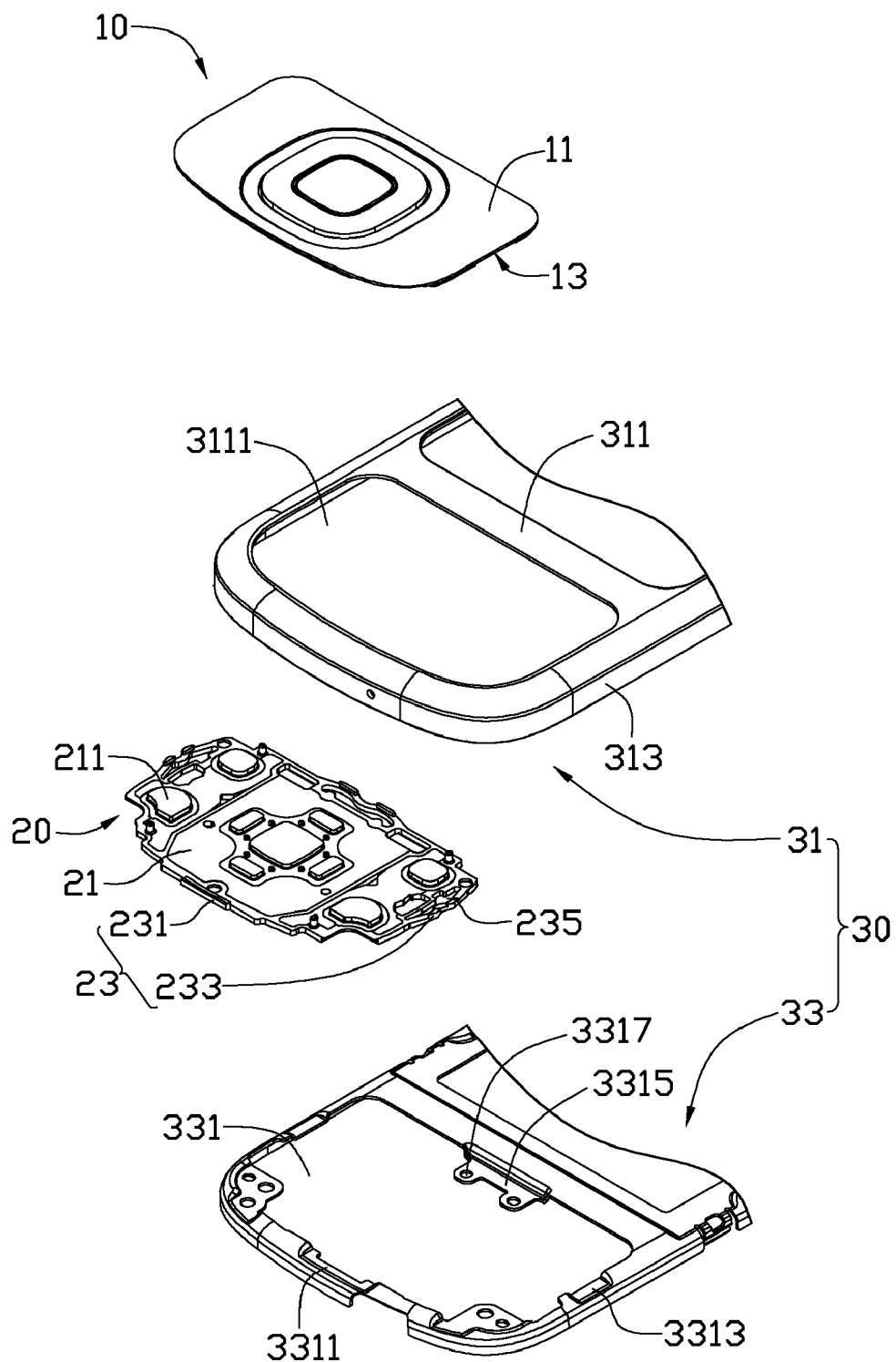
FIG. 2 shows an exploded perspective view of the key button structure shown in FIG. 1, in accordance with an exemplary embodiment.
Figure 3:
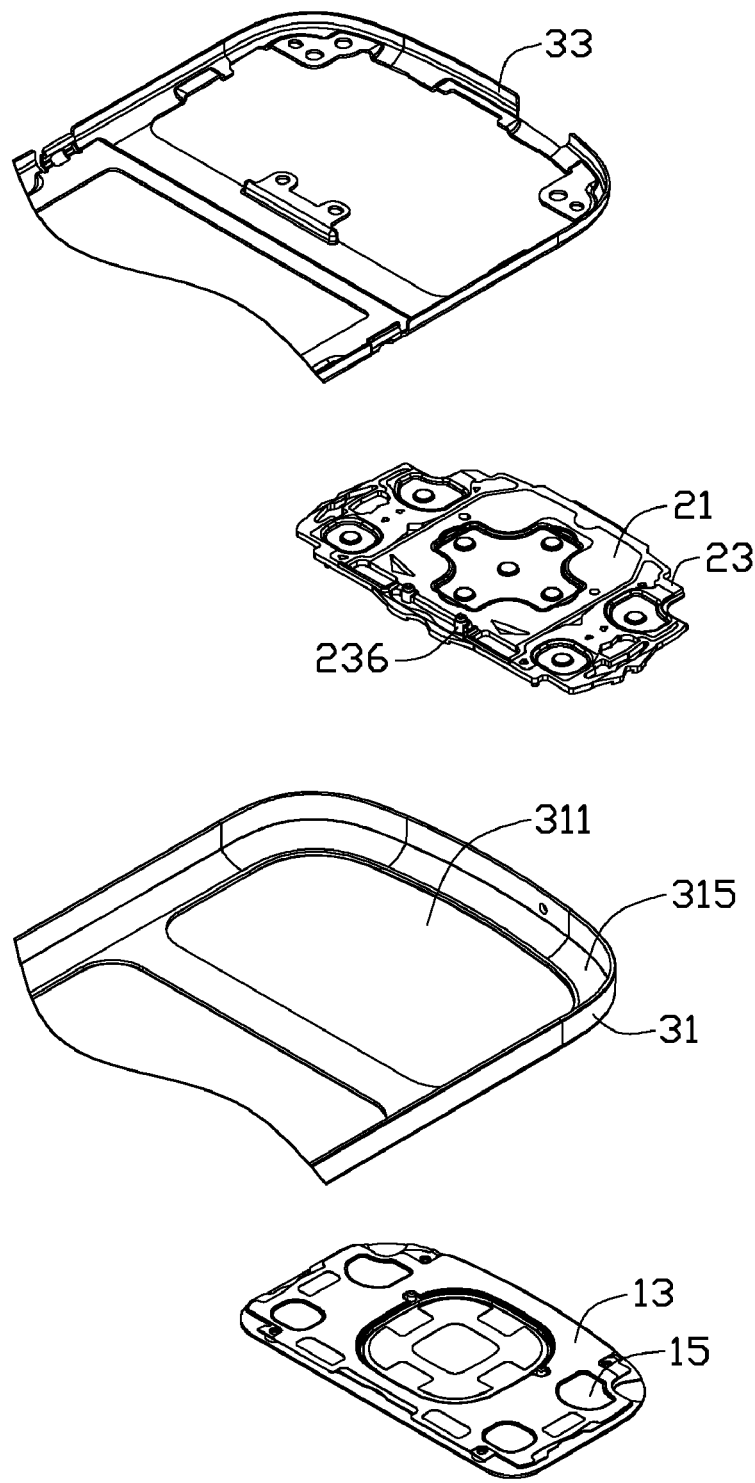
FIG. 3 is similar to FIG. 2, but viewed from another aspect.

FIGS. 1 through 3 show an exemplary key button structure 100 including a button body 10, a fixing member 20 and a housing 30. The button body 10 is mounted on the fixing member 20 and integrally assembled to the housing 30. The button body 10 includes an operating surface 11 and an assembling surface 13 opposite to the operating surface 11. A plurality, e.g., four grooves 15 are recessed near the four corners of the assembling surface 13 of the button body 10 respectively.

Figure 4:
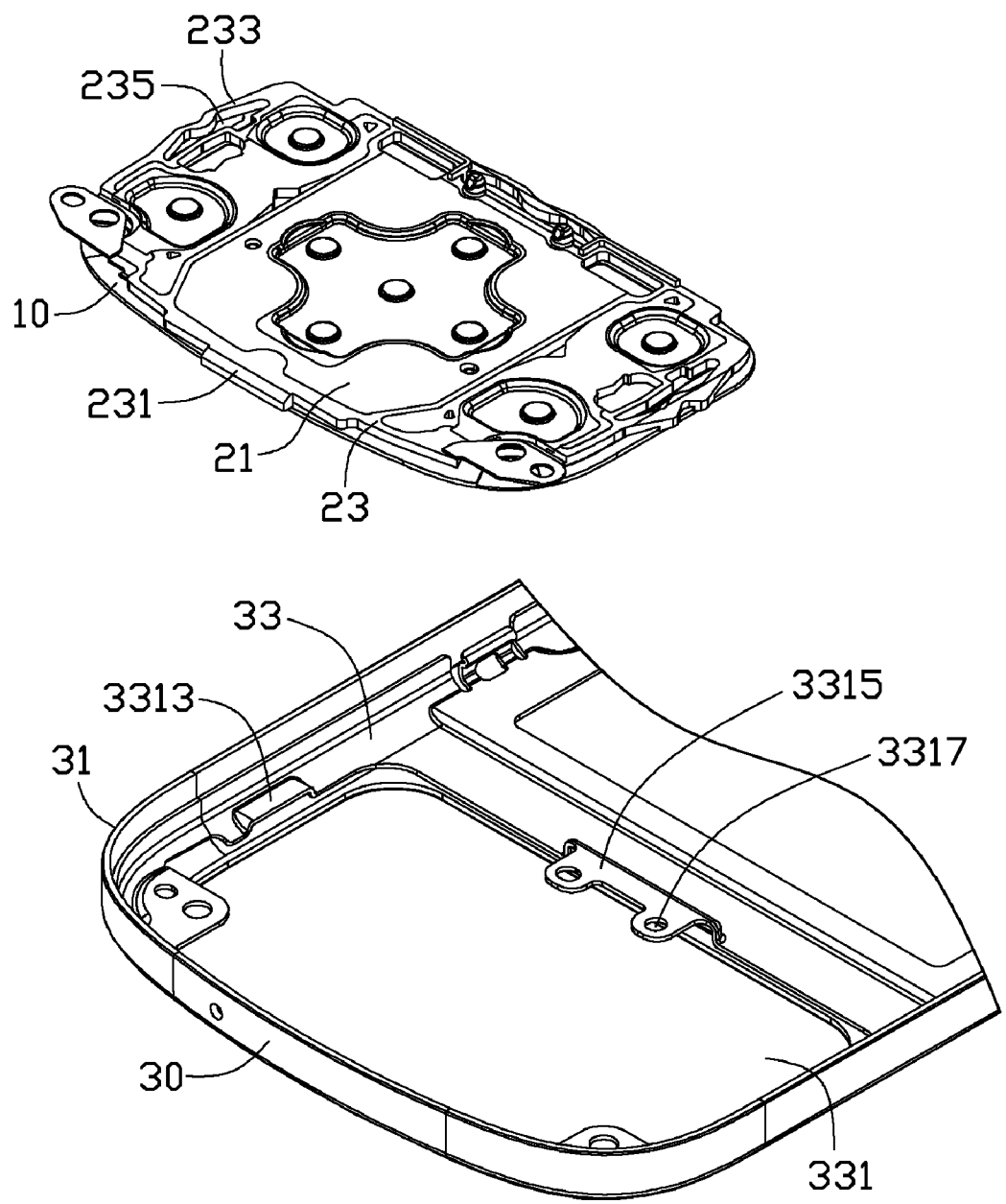
FIG. 4 shows an enlarged partial assembled perspective view of the key button structure.

Also referring to FIG. 4, the fixing member 20 is configured for fixing the button body 10 and includes a supporting board 21 and a fixing portion 23. The supporting board 21 may include a plurality, e.g., four protrusions 211 protruding from near the four corners thereof. The four protrusions 211 correspond to the four grooves 15 of the button body 10 respectively. The support board 21 and the four protrusions 211 can be made of transparent resilient materials and configured to be assembled within the corresponding four grooves 15 of the button body 10. Accordingly, a light within the electronic device may illuminate the button body 10, facilitating user operations. The fixing portion 23 can be made of opaque materials and includes a latching block 231 and three elastic arms 233. The latching block 231 is parallel to the supporting board 21 and extends outwardly from the middle portion of a side edge. The three elastic arms 233 are substantially wave shaped and extend out from three other side edges of the supporting board 21 respectively. Each elastic arm 233 forms a movement accommodation space 235 with the corresponding side edge of the supporting board 21. Accordingly, when the elastic arm 233 is pressed from outside, the elastic arm 233 is pushed into the accommodating space 235 toward the supporting board 21. Two fixing posts 236 protrude from the opposite surfaces of the support board 21 toward the protrusions 211 and are positioned adjacent to one elastic arm 233 opposite to the latching block 231.

Referring to FIGS. 2 through 4, the housing 30 includes a first housing 31 and a second housing 33 placed within the first housing 31. The first housing 31 and the second housing 33 can be made of metal materials and welded together. The first housing 31 includes a base shell 311 and a frame 313 surrounding the base shell 311. Accordingly, the base shell 311 and the frame 313 cooperatively define an accommodating space 315 for assembling the second housing 33 therein. The base shell 311 defines a substantially rectangular window 3111 therethrough adjacent to one end thereof corresponding to the button body 10.

The second housing 33 has substantially the same shape and size as the first housing 31 such that the second housing 33 can be tightly assembled in the first housing 31. The second housing 33 includes an assembling opening 331 defined therethrough corresponding to the window 3111 of the first housing 31. A latching slot 3311 is recessed in and adjacent to one end of the second housing 33 and communicates with the assembling opening 331 corresponding to the latching block 231 of the fixing member 20. Two assembling slots 3313 are recessed at two sides of the second housing 31 and communicate with the assembling opening 331 corresponding to the two elastic arms of the fixing member 20. The second housing 33 further includes a resisting block 3315 extending outwardly therefrom opposite to the latching sot 3311 and accommodated within the assembling opening 331. The resisting block 3315 includes two fixing holes 3317 defined through corresponding to the two fixing posts 236 of the fixing member 20 respectively.

Figure 5:
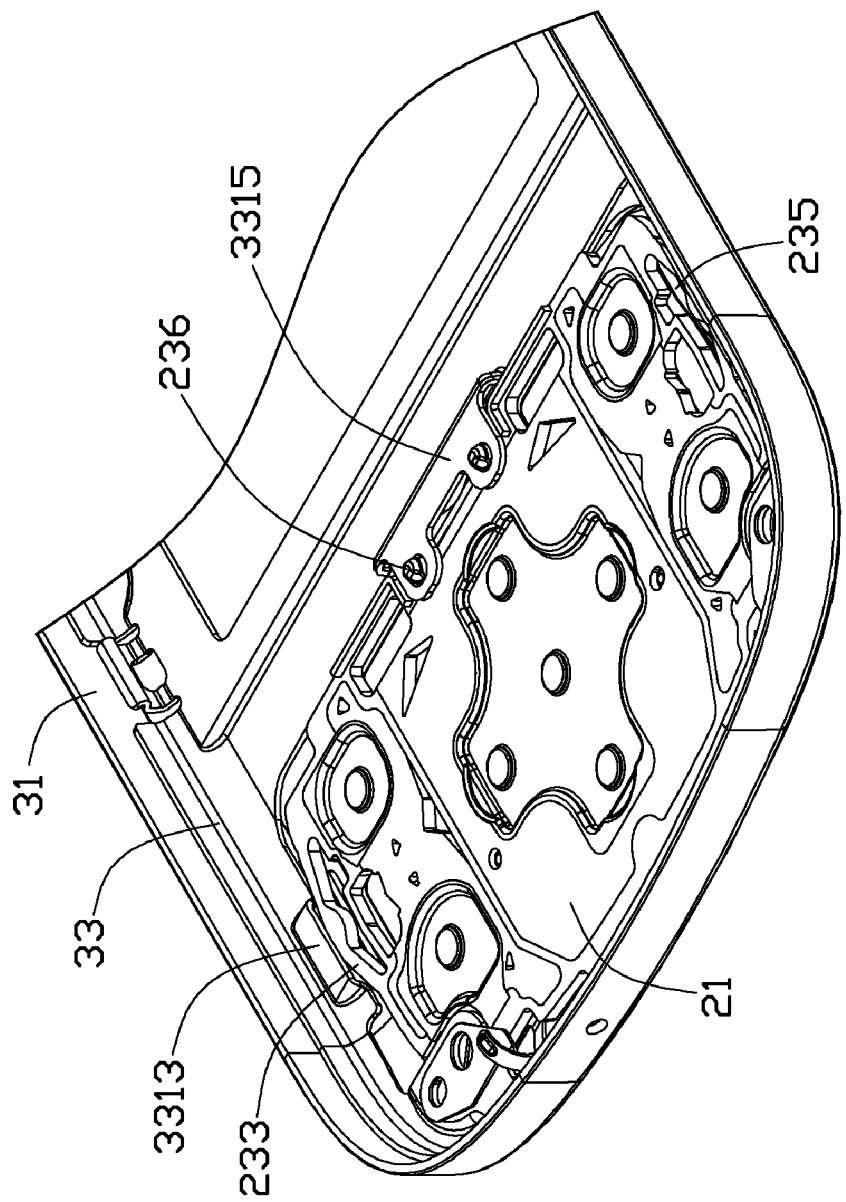
FIG. 5 shows another assembled perspective view of the key button structure, in accordance with an exemplary embodiment.

Referring to FIGS. 4 to 5, to assemble the key button structure 100, the second housing 33 is welded to the first housing 31 with the window 3111 of the first housing 31 facing the corresponding assembling opening 331 of the second housing 33. The button body 10 is adhered on the fixing member 20. The assembling surface 13 of the button body 10 resists against the fixing member 20 with the four protrusions 211 inserted into the corresponding grooves 15 of the button body 10. After that, the assembled button body 10 and fixing member 20 point at the window 3111 of the first housing 31 and are assembled into the housing 30. The latching block 231 and the two elastic arms 233 beside the two sides of the fixing member 20 latch into the corresponding latching slot 3311 and two assembling slots 3313 respectively. The elastic arm 233 opposite to the latching block 231 resists on the corresponding resisting block 3315 and the two fixing posts 236 positioned adjacent to one elastic arm 233 latch into the corresponding two fixing holes 3317 of the resisting block 3315 respectively. Then, the button body 10 and fixing member 20 are accommodated within the housing 30.

It is to be understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A key button structure, comprising:
a housing comprising a first housing and a second housing, the first housing and the second housing together defining an accommodating space; the first housing having a base shell, a frame surrounding the base shell and a window defined through the base shell communicating with the accommodating space, the second housing having an assembling opening defined therethrough corresponding to the window of the first housing;
a fixing member and a button body mounted on the fixing member, where the fixing member and the button body are inserted into the window of the first housing, such that the button body is exposed through the window; and
at least one elastic arm extends from a peripheral edge of a supporting board portion of the fixing member, wherein said elastic arm forms an accommodation space with the peripheral edge of the supporting board, which accommodates the second housing therein.

2. The key button structure as claimed in claim 1, wherein the button body includes an operating surface, an opposite assembling surface and a plurality of grooves recessed in the assembling surface of the button body, the fixing member includes the supporting board and a plurality of protrusions protruding from the supporting board, the protrusions are configured to be assembled into the corresponding grooves of the button body respectively.

3. The key button structure as claimed in claim 2, wherein the fixing member includes two elastic arms disposed at the peripheral edge of the supporting board; the second housing includes two assembling slots recessed therein corresponding to the two elastic arms; the button body is mounted on the supporting board, the two elastic arms resiliently latch into the corresponding two assembling slots of the second housing.

4. The key button structure as claimed in claim 3, wherein the fixing member further includes a latching block disposed thereon, the second housing further includes a latching slot recessed therein corresponding to the latching block such that the latching block latches into the corresponding latching slot.

5. The key button structure as claimed in claim 3, wherein the two elastic arms are substantially wave shaped extending outward from the peripheral edge of the supporting board and each elastic arm forms an accommodation space with the peripheral edge of the supporting board.

6. The key button structure as claimed in claim 5, wherein the second housing further includes a resisting block extending outward therefrom opposite to the latching sot and accommodated within the assembling opening; the fixing member further includes an elastic arm extending therefrom opposite to the latching block and configured to resiliently resist on the corresponding resisting block of the second housing.

7. The key button structure as claimed in claim 6, wherein the fixing member further includes two fixing posts disposed thereon opposite to the button body, the resisting block includes two fixing holes defined therethrough configured to fix with the corresponding two fixing posts of the fixing member respectively.

8. A key button structure, comprising:
a housing comprising a first housing and a second housing placed in the first housing, the first housing comprising a window defined therethrough, the second housing comprising an assembling opening defined therethrough corresponding to the window of the first housing; a button body; and
a fixing member configured to mount the button body thereon and being detachably assembled to the second housing integrally with the button body;
wherein the button body and the fixing member are accommodated within the assembling opening of the second housing with the button body exposed through the window; and
at least one elastic arm extends from a peripheral edge of a supporting board portion of the fixing member, wherein said elastic arm forms an accommodation space with the peripheral edge of the supporting board, which accommodates the second housing therein.

9. The key button structure as claimed in claim 8, wherein the fixing member includes the supporting board and two elastic arms extending outward from the peripheral edge of the supporting board; the second housing includes two assembling slots recessed therein adjacent to the peripheral edge of the assembling opening corresponding to the two elastic arms; the button body is mounted on the supporting board, the two elastic arms resiliently latch into the two assembling slots of the second housing.

10. The key button structure as claimed in claim 9, wherein the fixing member further includes a latching block disposed thereon, the second housing further includes a latching slot recessed therein corresponding to the latching block such that the latching block latches into the corresponding latching slot.

11. The key button structure as claimed in claim 10, wherein the support board is made of transparent material, the latching block and the two elastic arms are made of opaque material.

12. The key button structure as claimed in claim 9, wherein the two elastic arms are substantially wave shaped extending outward from the peripheral edge of the supporting board and each elastic arm forms an accommodation space with the peripheral edge of the supporting board.

13. The key button structure as claimed in claim 12, wherein the first housing includes a base shell and a frame disposed surrounding the base shell, such that, the base shell and the frame together define an accommodating space for assembling the second housing therein, the fixing member and the button body therein; the window is defined through the base shell.

14. The key button structure as claimed in claim 12, wherein the second housing further includes a resisting block extending outward therefrom opposite to the latching sot and accommodated within the assembling opening; the fixing member further includes an elastic arm extending therefrom opposite to the latching block and configured to resiliently resist on the corresponding resisting block of the second housing.

15. The key button structure as claimed in claim 14, wherein the fixing member further includes two fixing posts disposed thereon opposite to the button body, the resisting block includes two fixing holes defined therethrough configured to fix with the corresponding two fixing posts of the fixing member respectively.

16. A key button structure, comprising:
- a housing comprising a first housing and a second housing placed in the first housing, the second housing comprising at least one assembling slot recessed therein;
- a button body; and
- a fixing member comprising a supporting board and at least one elastic arm extending outwardly from a peripheral edge of the supporting board corresponding to the assembling slot, the elastic arm being substantially wave shaped and forming an accommodation space with the peripheral edge of the supporting board;
- wherein the button body is mounted on the supporting board, the button body and the fixing member are integrally and detachably assembled within the second housing, the elastic arm is resiliently latched into the corresponding assembling slot of the second housing.

17. The key button structure as claimed in claim 16, wherein the button body includes an operating surface, an opposite assembling surface and a plurality of grooves recessed in the assembling surface of the button body, the fixing member further includes a plurality of protrusions protruding from the supporting board, the protrusions are configured to be assembled into the corresponding grooves of the button body respectively.

18. The key button structure as claimed in claim 16, wherein the support board is made of transparent material, the elastic arm are made of opaque material.

19. The key button structure as claimed in claim 16, wherein the first housing defines a window therethrough, the second housing further defines a assembling opening therethrough, the button body and the fixing member are inserted into the window and accommodated within the assembling opening of the second housing with the button body exposures from the window.

20. The key button structure as claimed in claim 19, wherein when the elastic arm is pressed from outside, the elastic arm is deformedly pushed into the assembling opening toward the supporting board to allow the fixing member to pass through the window of the first housing.

* * * * *